P. HASSACK.
MANUFACTURE OF ARTIFICIAL STONE.
APPLICATION FILED FEB. 26, 1907. RENEWED DEC. 15, 1909.
968,943.
Patented Aug. 30, 1910.
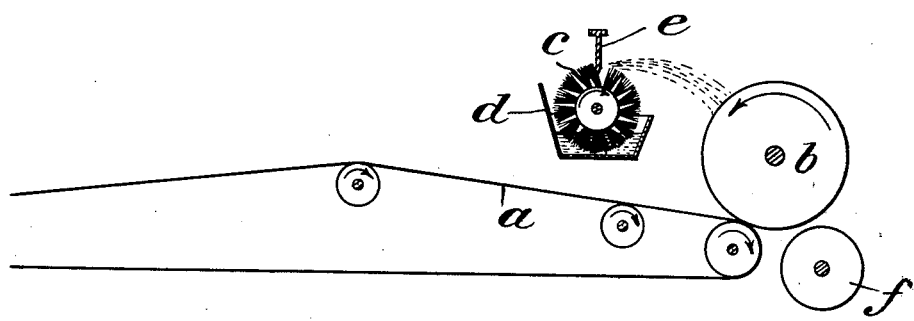
Attest:
Inventor:
Paul Hassack
by Redding, Kiddle & Greeley, Attys.

UNITED STATES PATENT OFFICE.

PAUL HASSACK, OF UNION HILL, NEW JERSEY, ASSIGNOR TO CHARLES SCHWARZKOPF, OF WEEHAWKEN, NEW JERSEY.

MANUFACTURE OF ARTIFICIAL STONE.

968,943.      Specification of Letters Patent.      Patented Aug. 30, 1910.

Application filed February 26, 1907, Serial No. 359,510. Renewed December 15, 1909. Serial No. 533,273.

*To all whom it may concern:*

Be it known that I, PAUL HASSACK, a citizen of the United States, and a resident of Union Hill, New Jersey, have invented certain new and useful Improvements in the Manufacture of Artificial Stone, of which the following is a specification, reference being had to the accompanying drawing.

The object of this invention is to produce an artificial stone which is strong, durable, weather-resisting and fire proof, and at the same time comparatively light and thereby particularly useful in building construction.

Artificial stone employed heretofore for building purposes has generally been composed of hydraulic cement and was therefore of a considerable specific gravity. In the manufacture of such artificial stone, the setting of the cement produced the hardening qualities or in other words the petrifaction thereof. In accordance with the present invention the cement is totally eliminated and petrifaction is produced by treating the mass chemically as it is being worked or molded into the desired form.

The use of artificial stone in the building trades generally requires that the stone be formed into plates, tiles or slabs of a comparative thinness; and on account of this requirement, a card-board or paper machine, or a machine of like nature, has been employed to work the ingredient mass into plates or layers of the desired thickness, after which the plates were allowed to harden or petrify. In the present case the same method of forming the plates has been adopted but, as the ingredients in the present case will not of themselves set or harden like cement for instance, the mass is chemically treated in order to produce the hardening during the forming process and, in the present instance, during the forming of the separate layers. In this way cement is not required to produce the petrifaction of the mass and the heaviness of the plates due to the cement is avoided.

The thorough hardening or setting of the mass or plates is effected in accordance with the invention, by chemically treating each separate thin layer as the plates are being formed. Practically any fibrous material may be employed for this purpose whether organic or inorganic in its nature. The fibrous material acts as a cohesive medium and the word "fibrous" as used herein is to be considered synonymous with the term "cohesive." A great variety of substances may be used as a filler, the chief quality of the filler being that it must permit the mass to harden under the action of the chemical or chemicals employed to produce petrifaction, and react with said chemical or chemicals to produce petrifaction.

The improvements will now be more specifically set forth by describing in detail a process which may be followed in making plates in accordance with the invention, and with reference to the accompanying drawing in which the single figure illustrates diagrammatically some of the parts of a card board machine.

Substantially equal quantities by weight of fibrous material and filler are placed in a rag engine or some other suitable device and are there ground or otherwise prepared whereby they are reduced to a suitable degree of fineness and are thoroughly commingled. The pulp thus produced is mixed with a sufficient quantity of water to form a workable paste, as in paper making, or preferably the mixing together of the fiber and filler is done in the presence of water. For a fibrous material, asbestos, cellulose, peat, mineral-wool, etc., may be employed, or for a filler, magnesite (magnesium carbonate), gypsum, zinc oxid and many other inorganic substances or a mixture of them may be made use of. If it be desired to give the resulting compound any particular color, a suitable coloring material such as china clay, iron oxid, black earth, etc., may be added to the mixture in the rag engine. The mass thus obtained is ready for the forming process. Where a cardboard or paper machine is used to effect the forming of the mass, the latter is placed in a suitable vessel with a stirring device in constant operation. To the vessel, water is constantly added from time to time to keep the mass in the form of a workable paste. The latter may be brought from the vessel, as in paper making, by means of the usual well-wheel and regulator-box, upon the endless porous belt of the machine where the excess of water is drained off and upon which the mass is left spread out in the form of a thin layer. This thin layer is conveyed by the belt to a rotating roller or drum to which it is transferred, one layer being rolled upon another upon the periphery of said roller as it rotates until a plate of the desired thickness is formed. As the mass of pulp is thus carried around by the roller, layer upon layer, it receives the chemical treatment heretofore referred to. The chemical solution which is employed at this point, as has already been stated, is of such a nature as to be capable of reacting with the particular filler employed, or with the mass of pulp, to produce petrifaction. It will be obvious that by treating each separate layer with a chemical solution capable of thus reacting upon the pulp to harden it, an interstitial reaction is produced which is very effective in producing the hardening of the mass throughout the entire plate. Where magnesite is used as a filler, a solution of zinc chlorid of a concentration of from 20 to 32 Baumé, is employed as the chemical solution. The particular chemical solution employed though will obviously depend upon the filler used, for it is only necessary that the filler and chemical solution be capable of reacting in the manner specified. The solution is continuously sprinkled upon the roller and the layers of pulp thereon as they are transferred to the roller, and this is done preferably by means of a rotating brush as is illustrated in the accompanying drawing presently to be referred to.

Referring to the drawings, $a$ represents the endless porous belt upon which the mass is conveyed in a thin layer to the rotating roller or drum which is shown at $b$. This rotating roller is preferably constructed to perform the function of a sieve as well as a roller so that the water may drain through the same as it rotates. As in the manufacture of card board, the thin layer upon the porous belt is transferred to the roller $b$ and, as will be obvious, one layer is superposed above another layer upon the surface of the roller $b$ as it continues to rotate. At a convenient point, the chemical solution is sprayed upon the outer layer through such means as a brush $c$ which revolves through the solution which may be contained in a basin $d$ and the bristles of the brush may be caused to discharge the solution in the direction of the drum by means of a fixed piece $e$ arranged in the path of the bristles so as to point them backwardly as the brush rotates and then suddenly release them. When the mass upon the roller has attained the desired thickness, it may be removed therefrom by bringing the roller $f$, usually termed the "wringer" in a card board machine, into contact with the roller $b$; or the mass upon the roller may be removed in any other suitable manner. The mass when taken from the rotating roller is still flexible although the hardening or petrifying sets in soon after. It is possible, therefore, as soon as a slab of material has been removed from the roller, to subject it to hydraulic pressure thereby increasing the density of the mass and strengthening the plate. As a rule, the mass may remain in the press from three to four hours, but if required, it can be removed from the press before the expiration of this length of time. The greater the pressure exerted upon the plates, the greater will be their density, and if desired, plates may be manufactured in this way which are suitable for lithographing purposes.

In the course of the hardening process, the plates become considerably heated, owing to the reaction which they undergo. They are subsequently allowed to cool off, a process requiring about twenty hours. After the plates are cool, they are preferably placed in a steadily renewed cold water bath in order to neutralize them, twenty-four hours being a sufficient time to effect their neutralization in this manner. Thereafter they are dried in a suitable drying room and then may be cut to the desired size. Although the plates produced in accordance with the process which has just been described are sufficiently impervious to moisture for all practical purposes, still it may be desired to render them more completely waterproof for use in particular cases. This may be done by increasing the degree of compression which they receive after their formation, or any suitable waterproofing process may be applied in order to render them absolutely impenetrable so far as moisture is concerned.

It will be understood, moreover, that the invention is not limited to the production of plates for use in building. Furthermore the invention is not limited to the production of plates, slabs, tiles and the like, but the artificial stone may be employed in other forms. Finally the word "stone" has been used to define the product, although it is much lighter than substances usually referred to as "stone." The term "artificial stone" has been used herein as synonymous with the expression "hard substance" or "substance that has set."

I claim as my invention:

1. The process of manufacturing artificial stone plates which consists in mixing together a fibrous material and a filler to form a pulp, forming from the pulp a series of thin layers which are laid one upon the other to constitute a plate, and treating each layer with a chemical solution capable of reacting with the filler to petrify the mass.

2. The process of manufacturing artificial stone plates which consists in mixing together a fibrous material and a filler insoluble in water to form a pulp, forming from the pulp a series of thin layers which are laid one upon the other to constitute a plate, and treating each layer with a chemical solution capable of reacting with the filler to petrify the mass.

3. The process of manufacturing artificial stone plates which consists in mixing together a fibrous material and an inorganic filler in water to form a pulp, forming from the pulp a series of thin layers which are laid one upon the other to constitute a plate, treating each single layer with a chemical solution to petrify the same, and subsequently pressing the formed plate and allowing it to harden.

4. The process of manufacturing artificial stone plates which consists in mixing together a fibrous material and a filler in water to form a pulp, forming from the mixture a series of thin layers which are laid one upon the other to constitute a plate, and treating each layer after it has been laid upon the adjacent layer with a chemical solution capable of reacting with the filler to petrify the mass.

5. The process of manufacturing artificial stone plates which consists in mixing together in water substantially equal parts of a fibrous material and a filler, forming from the mixture a series of thin layers one upon the other to constitute a plate, treating the layers of the mixture with a chemical solution to react with the filler to petrify the same, pressing the formed plate, allowing the same to harden, and cooling and neutralizing the same.

6. The process of manufacturing artificial stone plates which consists in mixing together substantially equal quantities of asbestos and magnesite, working the mixture into plates, and treating the mixture as it is being worked into plates with zinc chlorid.

7. The process of manufacturing artificial stone plates which consists in mixing together in water substantially equal parts of asbestos and magnesite, forming from the mixture a series of layers one upon the other to constitute a plate, treating a mixture as the layers are being formed with a solution of zinc chlorid, pressing the formed plate, allowing the same to harden and cool, and neutralizing the same.

This specification signed and witnessed this 25th day of February 1907.

PAUL HASSACK.

Signed in the presence of—
Thomas J. Canty,
Lucius E. Varney.